Jan. 10, 1956

H. J. MODREY 2,730,687

SELF LOCKING CONNECTING DEVICE FOR
DETACHABLY CONNECTING TWO ELEMENTS

Filed May 10, 1950

INVENTOR.
HENRY J. MODREY
BY Frederick E. Hane
ATTORNEY.

Jan. 10, 1956   H. J. MODREY   2,730,687
SELF LOCKING CONNECTING DEVICE FOR
DETACHABLY CONNECTING TWO ELEMENTS
Filed May 10, 1950   4 Sheets-Sheet 3
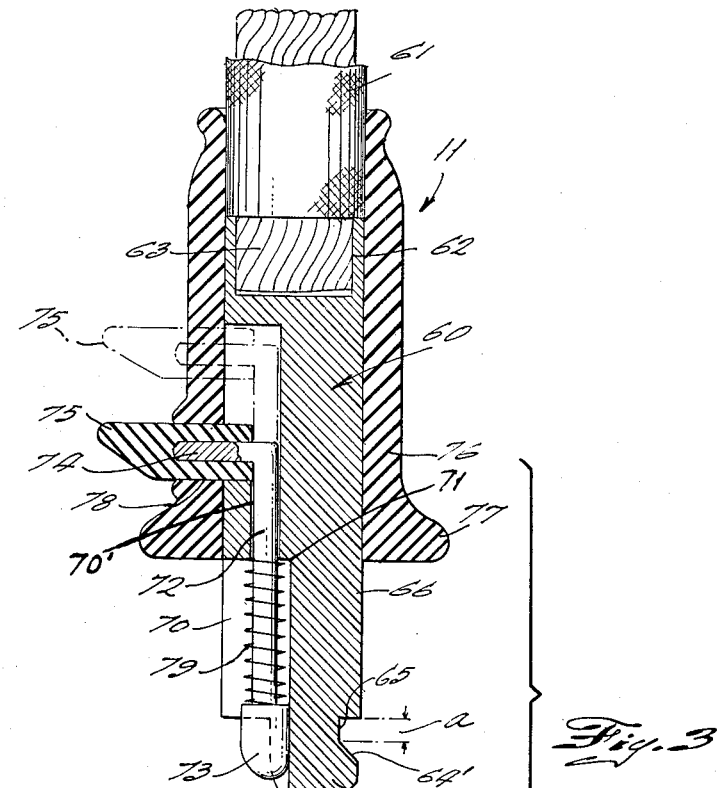
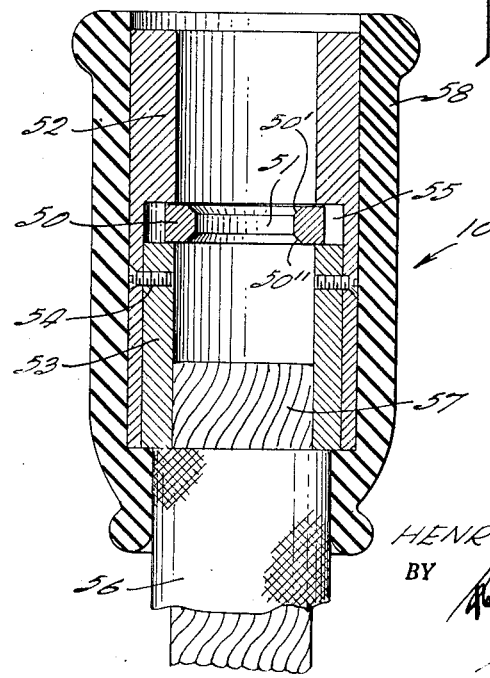
Fig. 3
INVENTOR.
HENRY J. MODREY
BY
ATTORNEY.

Jan. 10, 1956
H. J. MODREY
2,730,687
SELF LOCKING CONNECTING DEVICE FOR
DETACHABLY CONNECTING TWO ELEMENTS
Filed May 10, 1950
4 Sheets-Sheet 4
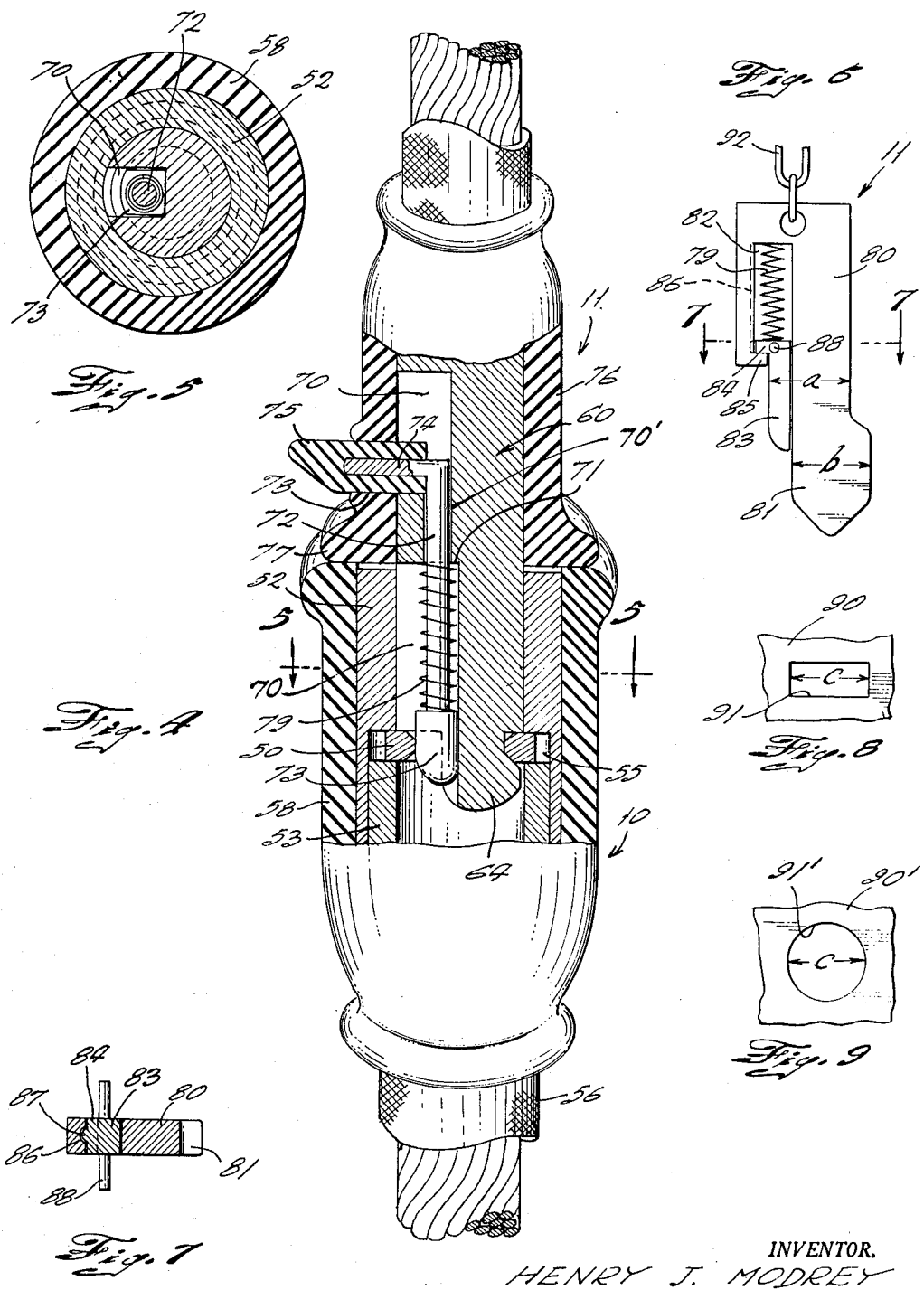
INVENTOR.
HENRY J. MODREY
BY
ATTORNEY.

United States Patent Office 2,730,687
Patented Jan. 10, 1956

2,730,687

SELF LOCKING CONNECTING DEVICE FOR DETACHABLY CONNECTING TWO ELEMENTS

Henry J. Modrey, Fleetwood, N. Y., assignor to Interlock Corporation, New York, N. Y., a corporation of New Jersey Application May 10, 1950, Serial No. 161,138

10 Claims. (Cl. 339—91)

This invention relates to self-locking connectors or couplings for detachably connecting an engaging and a receiving connector member.

More specifically, the invention relates to connector or coupling devices of the type in which the engaging member comprises a clamping rod with a onesidedly overhanging clamping head on one end and a wedging or locking slide slidable relative to the clamping rod. The receiving member comprises a wall member having an opening therethrough, the configuration of which corresponds approximately to the joint peripheral outline of the wedging slide and the clamping rod just below the clamping head while the joint peripheral outline of the slide and the clamping head is larger than the cross-section of said receiver opening. Upon complete passing of the clamping head through the receiver opening, space becomes, hence, available for the wedging slide to enter the receiver opening, thereby holding the clamping head in a position overhanging the receiver opening and preventing withdrawal of the clamping head through the said opening.

The connector members, thus latched together, are released by withdrawing the slide from the receiver opening, thereby permitting retraction of the clamping head through the receiver opening.

One of the objects of the present invention is to provide a novel and improved connector or coupling of the type, above referred to, which is simplified in construction and requires fewer parts than couplings of the same general design, as hitherto known.

Another object of the invention, allied with the preceding one, is to provide a coupling or connector device in which the clamping rod serves to guide and to hold captive the wedging slide and to house yieldable means biasing the slide into its locking position thereby obviating the necessity of a casing or sleeve for the locking mechanism. The elimination of the casing has also the important advantage that the connector has smaller overall dimensions than a connector of comparative strength requiring a casing.

Another object of the invention is to provide a novel and improved connector or coupling of the general type, above referred to, which by reason of its sturdy and simple design is particularly useful for coupling heavy cables, chains, ropes, etc. The increased sturdiness of the design is particularly due to the fact that the casing which, being a hollow body, is always liable to be deformed and, hence, to interfere with the required slidable relative movements is eliminated with a design according to the invention.

Another object of the invention, allied with the preceding one, is to provide a connector or coupling the coupling members of which can freely swivel relative to each other when latched together which feature is particularly advantageous when heavy cables, chains, etc. are to be joined.

Another object of the invention is to provide a novel and improved coupling or connector in which yieldable means on the engaging coupling member and in certain designs also on the receiving coupling member are arranged to seal the connecting device against moisture, and also to bias the wedging slide into its locking or wedging position.

Other and further objects, features and advantages of the invention will be pointed out hereinafter and set forth in the appended claims forming part of the application.

Connecting or coupling devices according to the invention can be advantageously used to establish either mechanical or electrical connections. In the first instance, each coupling member may be attached to a chain, wire, rope or similar element and in the second instance to an electrical cable or other suitable electrical conductor. It is also possible and practical to establish both, mechanical and electrical connections with the same connecting device.

In the accompanying drawing several embodiments of the invention are shown by way of illustration and not by way of limitation.

In the drawings:

Fig. 2a is a fragmentary perspective view of a modification of the engaging coupling member of a connector according to Figs. 1 and 2.

Fig. 3 is a longitudinal section of a connecting device according to the invention intended for establishing electrical connections, the coupling members being shown in disengaged position.

Fig. 4 is a view, partly in section, showing the connecting device according to Fig. 3 with the coupling members in locking position.

Fig. 5 is a section taken on line 5—5 of Fig. 4.

Fig. 6 is an elevational side view of a modification of an engaging coupling member for establishing mechanical connections.

Fig. 7 is a cross-section of Fig. 6 taken on line 7—7.

Fig. 8 is a fragmentary view of a receiving coupling member for an engaging coupling member according to Fig. 6.

Fig. 9 is a fragmentary view of a modification of a receiving coupling member.

Fig. 10 is a perspective side view of another modification of a connecting device for establishing mechanical connections, the coupling members being shown in disengaged position.

Fig. 11 is a perspective side view of still another modification of a connecting device for establishing mechanical connections, the coupling members being shown in disengaged position, and Fig. 12 is a cross-section of the engaging coupling member of Fig. 11 taken on line 12—12.

Figure 1:
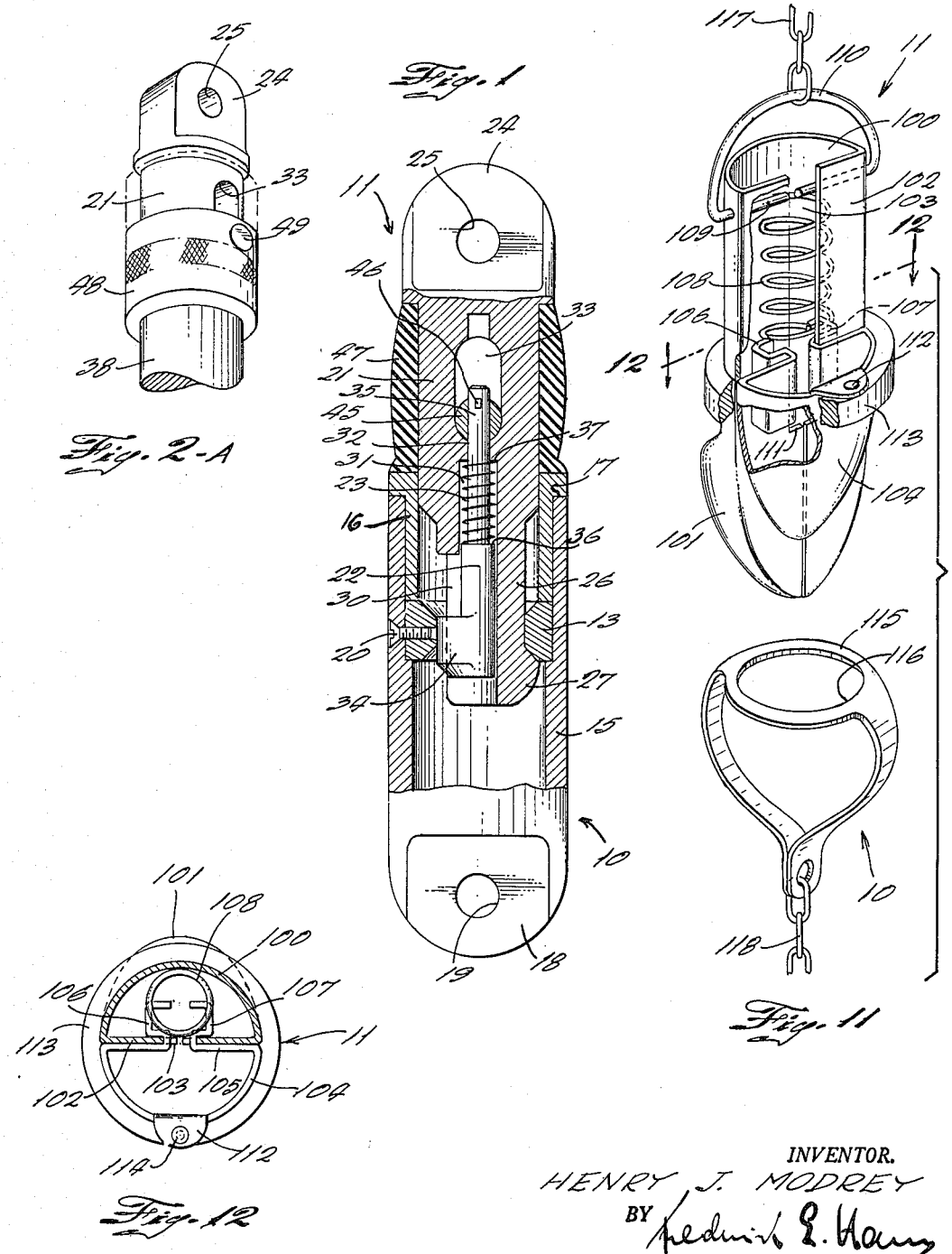
Fig. 1 is a longitudinal section through a connecting device according to the invention intended for establishing a mechanical connection, the coupling members being shown in locking position.
Figure 2:
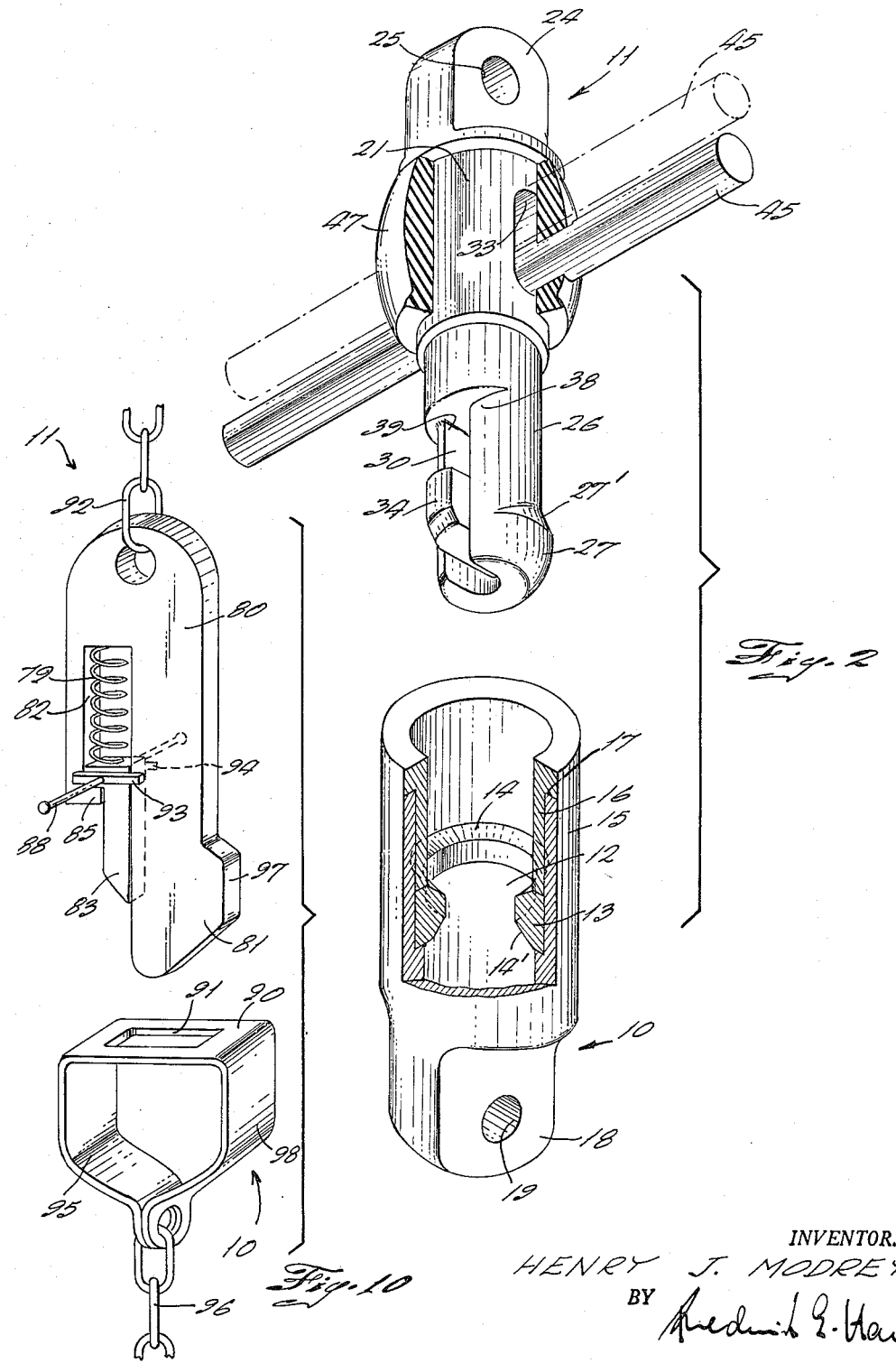
Fig. 2 is a perspective view, partly in section, of the connecting device according to Fig. 1, the coupling members being shown in disengaged position.

Referring first to Figs. 1 and 2 in detail, the connecting device according to these figures is shown as being designed for establishing a mechanical connection between two elements (not shown). By modifying certain parts of the connecting device, the same can also be advantageously employed for establishing electrical connections, as will be more fully explained hereinafter. The connecting device comprises a receiving coupling member generally designated by 10 and an engaging coupling member generally designated by 11 which coupling members can be releasably latched together.

Receiver 10 has a receiving opening 12 which serves to receive the locking mechanism of the engaging coupling member 11. This opening 12 is defined by a ring 13 which is preferably counter-sunk at 14 and 14' to guide the locking mechanism of coupling member 11. Ring 13 is fitted in an outer sleeve 15 having a shoulder for the ring. The ring is held in position by an inner sleeve 16. The upper or receiving end of sleeve 16 is preferably provided with an outwardly extending collar 17 seated upon the corresponding edge of sleeve 15. The opposite end of sleeve 15 is closed and flattened at 18 as can best be seen on Fig. 2. A hole 19 through the flattened portion 18 serves to receive one of the elements to be latched together by means of the connecting device, for instance a shackle of a chain or a pin or securing the receiving member 10 to a wall. A countersunk screw 20 penetrating sleeve 15 and extending into ring 13 may be provided to prevent rotation of ring 13 relative to sleeve 15.

Engaging coupling member 11, more particularly the locking mechanism thereof, comprises a clamping rod 21, a wedging slide 22, and a spring 23. Clamping rod 21 is provided at one end with means for securing the other one of the two elements to be latched together to the connecting device. These means are shown as being similar to the corresponding means of the receiver 10, that is, the end of rod 21 is flattened at 24 and provided with a hole 25 through which a shackle of a chain may be fitted.

The widest portion of rod 21 (the upper portion on Figs. 1 and 2) can enter sleeve 16 as can best be seen on Fig. 1. The lower portion of the clamping rod is set off at 26 to form a clamping head 27 having a clamping lip 27'. This clamping head is eccentric to the general rod axis so that it overhangs onesidedly rod portion 26 and is tapered toward its tip (see Fig. 2) so that it can be inserted in ring 13 with a slight tilt. This figure further shows clearly that the clamping rod with its clamping head has a generally circular cross-section but various other cross-sections can also be employed as will be more fully explained hereinafter. Rod portion 26 and also the clamping head are provided with an axial open recess 30 receiving and guiding wedging slide 22. Recess 30 is axially continued by a bore 31 housing spring 23, and a narrower bore or cavity 32. The upper or widest portion of rod 21 is provided with a transverse elongated slot 33 in alignment with bore 32.

Wedging slide 22 is shown as having a wedging head 34 at its lower end adjacent to the clamping head 27. The upper portion 35 of the wedging slide is set off to form a shoulder at 36 for holding spring 23 between the said shoulder 36 and a second shoulder 37 formed by bore 32 within rod 21. As will be noted, slide portion 35 is positively guided by bore 32.

Part of the cylindrical wall of rod portion 26 is somewhat inwardly withdrawn at 38 and 39 as can best be seen on Fig. 2, so that slide head 34 protrudes onesidedly from this portion of the rod. The slide head is so dimensioned and shaped that it is complementary with the general outline and configuration of clamping head 27. In other words, it will substantially fill recess 30 in the clamping head 27.

The combined cross-section through rod portion 26 and slide head 34 is so selected that rod portion 26 and slide head 34 can pass through receiver opening 12 while the combined cross-section of clamping head 27 and slide head 34 corresponds to the cross-section of receiver opening 12 plus the clamping head portion onesidedly overhanging rod portion 26. In other words, clamping head 27 will fit through opening 12 when slide head 34 is withdrawn from the clamping head but its cross-section exceeds the cross-section of the receiver opening by the extent of the eccentricity of the clamping head when the slide head 34 is alongside clamping head 27.

As previously mentioned, spring 23 urges slide head 34 toward clamping head 27. For the purpose of withdrawing the slide head against the action of the spring, any suitable means in operative engagement with the slide may be provided. According to the embodiment shown, a cross-bar 45 is secured to slide portion 35, for instance by means of a cotter pin 46. As will be evident, spring 23 urges the slide into a position in which cross-bar 45 is abutting against the lower end of slot 33 as shown in Fig. 2 in full lines. It will further be apparent that movement of bar 45 into the position shown in Fig. 2 in dotted lines will withdraw slide head 34 relative to the clamping head 27.

Engaging coupling member 11 may be provided with a flexible sleeve or grommet 47 made of rubber or any other suitable material, particularly when water or dust-proofing is required. This grommet has suitable openings through which bar 45 protrudes. As will be apparent, grommet 47 seals the connecting device against entrance of moisture through slot 33. The grommet permits axial displacement of the bar in slot 33 by reason of its flexibility. The lower edge of the grommet facing the clamping head is preferably flat so that the grommet can seat itself snugly upon the corresponding flat upper edge of flange 17 when the two coupling members are latched together. The length of the grommet, which is preferably somewhat beaded at its lower edge, is so selected that the flat edge of the grommet is pressed against the flange 17 thereby further sealing the connecting device against moisture. Finally, it will be evident that grommet 47 acts parallel and supplemental to spring 23 so that it can substitute for said spring in case of a break.

The two coupling members may be visualized as being both movable and each attached to the end of a chain, wire or other element, or one of the two members can be visualized to be stationary.

As will be apparent from the previous specification and Figs. 1 and 2, the clamping rod and the wedging slide are structurally so combined that the wedging slide is positively held by the clamping rod so that the slide can move axially relative to the rod and the clamping head thereof but cannot tilt away from the rod. As a result, the clamping rod does not only serve as an essential part of the locking mechanism but also to house and support other parts of the locking mechanism so that a separate casing for the mechanism is no longer necessary. The structural relationship of the clamping rod and the wedging slide is hereinafter sometimes referred to as a "captive" relationship.

The operation of the connecting device according to Figs. 1 and 2 is as follows:

Let it be assumed that it is desired to latch the two coupling elements of Fig. 2 together. For this purpose, the clamping rod portion 26 and the clamping head 27 are inserted in sleeve 16 until the portion of the clamping head protruding beyond slide head 34 is fitted in ring opening 12. When now the two coupling members are further applied one to the other, the countersink 14 of ring 13 will help to press the slanted slide head 34 back against the action of spring 23 and grommet 47. At the same time, clamping head 27 penetrates further through ring opening 12 until the overhanging portion of the clamping head reaches the position shown in Fig. 1 in which clamping lip 27' abuts against countersink 14' of ring 13. As the clamping head penetrates the ring, space becomes available for slide head 34 so that the combined action of spring 23 and grommet 47 will snap the slide head 34 back into its original position which now becomes the locking position as can be clearly seen on Fig. 1.

Inasmuch as the clamping head 27 is eccentric to the general rod axis it must perform a certain lateral movement corresponding to the extent of the overhang or eccentricity during the locking operation. To permit such transverse movement, a corresponding ratio between the width of the various elements of the locking mechanism and the depth of the cup formed by ring 13 and the side walls of sleeve 16 must, of course, be maintained. In particular the widest portion of the rod should fit sleeve 16 with a loose fit just sufficient to permit the required lateral movement of the rod and the insertion thereof with a slight axial tilt.

For the purpose of separating the two connecting members, bar 45 is lifted into the position shown on Fig. 2 in dotted lines, thereby permitting withdrawal of the clamping head through ring opening 12. As will be obvious, the clamping head 27 must again make a lateral movement but in opposite direction.

While the receiver has been shown in Figs. 1 and 2 as a self-contained structure, the receiving opening may also be formed in a wall or frame, provided the wall or frame thickness does not exceed the clamping capacity of the connector, that is, the distance between the tip of the fully retracted slide and the upper edge or lip of the enlarged clamping head and that there is sufficient space for the overhang movement of the clamping head and also for the inserted clamping head.

In the engaging coupling member according to Fig. 2a, grommet 47 and bar 45 are replaced by a substantially rigid sleeve 48 slidable on rod 21 and secured to wedging slide 35 by a rivet 49. The locking position of the sleeve is shown in full lines and the retracted position in phantom.

The connecting device according to Figs. 3, 4 and 5 designed for establishing electrical connections, is similar in principle to the connecting device as described in connection with Figs. 1 and 2.

The receiving coupling member 10 of the device again comprises a locking or receiving ring 50 defining a receiver opening 51. Ring 50 is countersunk at 50' and 50" respectively and is held and guided by two metal sleeves 52 and 53, sleeve 53 being secured to sleeve 52 by screws 54 or similar means. Part of sleeve 52 is set off to form an annular recess 55 for ring 50. The diameter of this recess is larger than the outer diameter of ring 50 to permit a lateral floating movement of the ring. Sleeve 53 is electrically connected to an electric conductor such as a power cable 56 for instance by sweating the blank end 57 of the cable into sleeve 53. As a result, ring 50 and the upper (as seen on the drawing) or receiving end of sleeve 52 form the socket terminal of the connecting device. For purpose of electrical insulation and also of protection against the entrance of moisture, as will be more fully explained hereinafter, sleeve 52 is encased by a cap 58 of flexible insulation material such as rubber. As will be noted, cap 58 protrudes slightly above the receiving edge of sleeve 52 to permit axial compression of cap 58.

In this connection, it should be mentioned, that one of the most essential elements of the receiving member of the connecting device is the laterally floating ring 50 and that the components of the receiver in which the said ring is mounted may be modified in various respects without departing from the scope and spirit of the invention.

The engaging coupling element 11 of the connecting device comprises a clamping rod 60 to which is electrically connected an electric conductor such as a power cable 61 for instance by providing an axial bore 62 in one end of rod 60 in which bore the blank end 63 of cable 61 is sweated. The opposite or engaging end of rod 60 is provided with a clamping head 64. This clamping head is formed by recessing the clamping head at 65. The general configuration of the clamping head can best be seen on Fig. 3. It should be noted in this connection but will be more fully explained hereinafter, that the clamping head is again onesidely or eccentrically overhanging the clamping rod proper in relation to the center axis of the clamping rod portion a which constitutes the rod portion actually effective for the locking operation. The wider section 66 of the clamping rod serves primarily to guide the rod in sleeve 52 and to carry current.

Rod 60 has an open axial recess 70 continued by a closed narrowed portion 70'. This latter portion forms a shoulder at 71. Recess 70, more particularly portion 70' thereof, houses and guides a wedging or locking slide 72 by holding the same captive in rod 60. The slide has a head 73 on its end facing clamping head 64. The opposite end of slide 72 is bent off at 74 to support a trigger or grip 75 made of suitable insulation material. It will be evident that rod 66 and, hence, slide 72 will carry current so that they constitute the plug terminal of the connecting device. For purpose of electrical insulation and also as protection against moisture, clamping rod 60 is encased by a cap 76 made of flexible insulation material such as rubber. Cap 76 may be beaded at 77 and has a lateral hole 78 through which trigger 75 protrudes with a tight fit to prevent seepage of moisture. A coil spring 79 surrounding the slide shaft and abutting with one end against shoulder 71 serves to bias slide head 73 toward and alongside clamping head 64.

The cross-section of part 66 of rod 60 corresponds to the inner cross-section of sleeve 52; the combined cross-section of the rod at recess 65 and of slide head 73 corresponds to the cross-section of receiver opening 51; and the combined maximal cross-section of the clamping head 64 and slide head 73 corresponds to the cross-section of receiver opening 51 plus the one sidedly overhanging portion of the clamping head.

Both the coupling members may again be visualized as being movable, for instance each being attached to the end of a cable, or one of the coupling members may be visualized as being stationary.

As will be evident, the wedging slide is again held captive by the clamping rod, as previously explained.

The locking operation will be apparent from the previous description. The essential difference between the previously described locking operation and the present locking operation is that the required relative lateral movement between the clamping rod with the wedging slide and the receiver ring opening is now performed by the ring proper. As will be noted, clamping head 64 which cannot move laterally since rod portion 66 is held in sleeve 52 when the clamping head begins to penetrate ring 50, displaces this ring in the wide recess 55 until head 64 centers the ring and the edge of the ring pushes slide head 73 back, spring 79 and the elasticity of rod cap 76 permitting such axial displacement of the slide head. When clamping head 64 has completely penetrated ring 50 and reached substantially the position shown in Fig. 4, ring 50 is juxtaposed to rod recess 65. The stored spring pressure acting upon slide head 73 causes ring 50 to slide into a position in which space becomes available for the slide head to move into the position alongside the clamping head, as shown in Fig. 4, so that coupling member 11 is now locked to coupling member 10 and the desired electric connection is established. As will be apparent, the coaction between ring 50 and clamping head 64 is in effect a guided cam action in that first the tip of the clamping head, by engaging countersink 50', positions the ring for entry of the head, then the incline of the clamping head tip shifts the ring sideways and finally the lip 64' of the clamping head, by engaging countersink 50", returns the ring into its central position aided therein by the spring actuated wedging slide.

For the purpose of separating the coupling members, trigger 75 is pulled into the position shown in Fig. 3 in dotted lines. Clamping head 64 can now pass through the receiver opening 51 and the coupling members can be separated.

As will be noted, rubber caps 58 and 76 are pressed together when the coupling members are joined, thereby preventing the entrance of moisture into the connecting device and also preventing access to current carrying parts of the device. Furthermore, rubber cap 76 supplements the action of spring 79 and is holding the coupling members locked in case the spring should break.

The provision of a floating ring is particularly advantageous when the connecting device is used to establish electrical connections as it permits an increased metallic contact between the current carrying parts of the coupling members.

In particular, the ring permits a comparatively tight fit and hence contact pressure between rod portion 66 and sleeve 52 since the lateral ring movement provides the required transverse relative movement of the engaging and receiving components of the connector and also allows considerable depth of the sleeve thus further increasing the contact area.

If the coupling members are or may be subjected to a great pull strength, a fixed receiver ring is generally preferable.

It should be noted that the connecting device according to Figs. 3 to 5 could also be used for establishing mechanical connections by securing ropes, chains, etc. to the respective elements of the coupling members. Similarly, the connecting device according to Figs. 1 and 2 can be used for establishing electrical connections by connecting electric conductors to clamping rod 21 and sleeve 15. Of course, a suitable outer insulation for the receiver member of Figs. 1 and 2 should be provided.

Figs. 6 and 7 show a simplified embodiment of an engaging coupling member according to the invention. According to these figures, the engaging coupling member comprises a clamping rod 80 having an enlarged clamping head 81 on one end. The other end of the clamping rod is widened and provided with an axially elongated bore or cavity 82. A wedging or locking slide 83 is disposed axially slidably within bore 82. As will be apparent, the inner wall of the rod defining said bore is positively guiding the wedging slide so that the same is held captive by the rod. Spring 79 abutting at one end against the base of bore 82 and at the other end against a flange 84 of the wedging slide urges the latter toward and alongside the clamping head. A flange 85 of rod 80 limits the movement of the slide toward the clamping head.

To prevent the wedging slide from being laterally twisted out of bore 82, suitable guide means are preferably provided. The guide means are shown as a longitudinal groove 86 in the rod engaged by a correspondingly shaped nose 87 in the wedging slide.

For the purpose of withdrawing the slide relative to the clamping head against the action of spring 79, suitable actuating or lifting means should be provided. These means are shown in the present instance as a handle or grip 88 extending from both sides of the slide.

The receiving member of the coupling may take any of the designs shown in the figures previously described or hereinafter described. It may also be visualized as a suitably shaped hole in a wall, frame or panel, as previously defined. For sake of simplicity, the receiving member is shown as a fragment of a plate 90 having a rectangular opening 91 therethrough.

The relative dimensions of the clamping rod, the clamping head, the wedging slide and the receiving opening are so selected that the widths of the respective elements satisfy the following equation:

$$a=b=c$$

assuming, of course, that the necessary clearances are provided for the engaging parts.

The operation of the connecting device according to Figs. 6, 7 and 8 will be obvious from the previous description. It suffices to say that by insertion of the clamping head into opening 91, slide 83 is pressed back until the clamping head has completely penetrated the opening whereupon slide 83 is snapped by spring 79 toward the clamping head to fill the space made available by the clamping rod thereby locking the clamping head within the receiving opening.

Figs. 6 and 8 show a rectangular cross-section of the clamping rod and the receiving opening respectively. However, it will be obvious that these elements can also have any other suitable cross-section.

Fig. 9 shows a plate 90' having a circular receiving opening 91'.

The clamping rod may be secured to a chain 92.

The connecting device according to Fig. 10 is similar to the one described in connection with Figs. 6 to 8. The same numerals are used to identify corresponding parts. The engaging coupling member of the device is distinguished from the engaging coupling member according to Fig. 6 by the guide means for positively holding slide 83 within bore or cavity 82. According to Fig. 10, guide bars 93 and 94 are secured to the wedging slide on each side of the clamping rod 80. As will be evident, these guide bars prevent the slide from being laterally twisted out of bore 82.

In this connection it should be mentioned that it is not necessary that the means for lifting the slide against the action of spring 79 are secured to the slide directly. It is quite practical and in certain instances preferable to attach a chain or wire to the slide so that the same can be lifted from a remote point.

Plate 90 of the receiving coupling member is shown in Fig. 10 as part of a member 95 which is secured to a chain 96 so that the connecting device can be used to couple the two chains 92 and 96.

While the clamping rod is shown as being rectangular, it will be obvious that again other suitable cross-sections of the clamping rod and the wedging slide may be provided.

As will be noted, the lateral flat portion 97 of clamping head 81 bears against the corresponding flat portion 98 of receiver 95 when the coupling members are connected. This has the advantage that the engaging coupling member is steadied and held straight. In case, the connector is used for establishing electric connections, the engaging surfaces also serve to increase the contact area. With the connectors according to Figs. 1 to 4, the engaging coupling member is steadied by the deep cup of the engaging coupling member.

It will also be apparent that the connecting devices according to Figs. 6 to 10 can be easily adapted for use as self-locking electrical connectors.

Figs. 11 and 12 show an engaging coupling member, the clamping rod 100 of which is formed by bending sheet metal in a hollow body having a substantially semi-circular cross-section. One end of the hollow body is enlarged to form an eccentric enlarged clamping head 101. The flat side 102 of the clamping rod includes an elongated axial slot 103 in which a wedging or locking slide 104 is axially slidable. The wedging slide is also preferably formed by bending sheet metal so as to form a hollow body the configuration of which can be clearly seen on Fig. 11. The ends of the sheet metal portions forming the flat face of the wedging slide are bent outwardly to form two double U-portions 106 and 107 respectively. The two inner U-portions serve to guide the wedging slide in slot 103 of the clamping rod while the outer U-portions form an abutment for one end of a spring 108. The other end of said spring abuts against the ends 109 of a loop 110 which ends are extended into the hollow interior of rod 100.

Spring 108 is loaded to urge the slide toward the clamping head 101, the base edge 111 of slot 103 limiting the movement of slide 104 by the action of the spring. A grip or lip 112 extending from the upper edge of the slide serves to withdraw the latter relative to the clamping head against the action of spring 108 but it will be obvious that the slide position can also be controlled by a ring or sleeve 113 surrounding the clamping rod and fastened to grip 112 for instance by a rivet 114 or from a remote point by attaching a chain or wire to the slide.

The receiving coupling element is shown also as being formed of sheet metal. It comprises a face plate 115 including a circular receiving opening 116. The relative dimensions of the coacting elements will be obvious from the previous description, particularly the description of Figs. 6 and 8.

The two elements to be detachably joined by the connecting device are shown as chains 117 and 118 respectively.

Ring 113 also serves to steady the engaging coupling member and to hold the same straight by abutting under pressure against the flat face of plate 115 when the coupling members are latched together.

The locking action between the two coupling members will be obvious from the previous description. It suffices to say that slide 104 is pressed back by the receiving coupling member until clamping head 101 has completely penetrated receiving opening 114 and made space available for the slide 104 which is then snapped forward by the compressed spring 108.

It will be obvious that the cross-section of the clamping rod and the clamping head are not limited to the semicircular shape shown in Figs. 11 and 12 but that various other shapes may be formed by bending sheet metal accordingly. Furthermore, in certain instances other suitable materials, such as plastic, may also be employed.

In the previous description, it has been stated that the withdrawal of the slide is effected by manual operation. However, it should be noted that the slide can also be power operated, for instance by electromagnetic means, fluid pressure or pneumatic pressure or suction.

While the invention has been described in detail with respect to certain now preferred examples and embodiments of the invention it will be understood by those skilled in the art after understanding the invention, that various changes and modifications may be made without departing from the spirit and scope of the invention and it is intended, therefore, to cover all such changes and modifications in the appended claims.

What is claimed as new and desired to be secured by Letters Patent is:

1. An engaging coupling member for a connecting device of the type comprising a receiver coupling member including a wall member having an opening therethrough adapted to receive the engaging coupling member in detachably locking engagement, said engaging coupling member comprising a clamping rod including an opening and having a clamping head on one end eccentrically overhanging the rod, a locking slide disposed axially slidably in said opening, at least part of the rod wall defining said opening guiding said slide and holding the same in captive position alongside and parallel to the rod, the combined peripheral outline of the clamping rod just below the clamping head and of the slide approximately fitting the cross-section of said receiving opening and the combined peripheral outline of the clamping head and the slide exceeding the cross-section of the receiving opening, yieldable means urging the slide toward the clamping head, retaining means on the clamping rod and the locking slide coacting with each other for limiting the movement of the slide toward the clamping head by the action of said yieldable means, and actuating means for withdrawing the slide relative to the clamping head against the action of said yieldable means.

2. An engaging coupling member for a connecting device of the type comprising a receiver coupling member including a wall member having an opening therethrough adapted to receive the engaging coupling member in detachably locking engagement, said engaging coupling member comprising a clamping rod including an axially elongated opening and having a clamping head on one end eccentrically overhanging the rod, a locking slide disposed axially slidably in said opening, at least part of the rod wall defining said opening guiding said slide and holding the same in captive position alongside the rod and parallel to the rod axis, the combined cross-section of the clamping rod just below the clamping head and of the slide approximately fitting the cross-section of said receiving opening and the combined cross-section of the clamping head and the slide exceeding the cross-section of the receiving opening, a coil spring disposed within said elongated opening and encompassing said slide, said spring being arranged and positioned to bias the slide toward the clamping head, and actuating means for withdrawing the slide relative to the clamping head against the action of said spring.

3. An engaging coupling member for a connecting device of the type comprising a receiver coupling member including a wall member having an opening therethrough adapted to receive the engaging coupling member in detachably locking engagement, said engaging coupling member comprising a clamping rod including an opening and having a clamping head on one end eccentrically overhanging the rod, a locking slide disposed axially slidably in said opening, at least part of the rod wall defining said opening guiding said slide and holding the same in captive position alongside the rod and parallel to the rod axis, the combined cross-section of the clamping rod just below the clamping head and of the slide approximately fitting the cross-section of said receiving opening and the combined cross-section of the clamping head and the slide exceeding the cross-section of the receiving opening, a sleeve made of flexible material slidably fitted upon said rod, the sleeve end opposite to said clamping head being secured to the rod for preventing slidable displacement of the entire sleeve relative to the rod, the axial length of the sleeve being so selected that the said sleeve engages the receiver coupling member and experiences a compression in axial direction when said clamping head and said slide are received by said receiving opening, and actuating means for withdrawing the slide relative to the clamping head against the action of said sleeve.

4. An engaging coupling member for a connecting device of the type comprising a receiver coupling member including a wall member having an opening therethrough adapted to receive the engaging coupling member in detachably locking engagement, said engaging coupling member comprising a clamping rod including an opening and having a clamping head on one end eccentrically overhanging the rod, a locking slide disposed axially slidably in said opening, at least part of the rod wall defining said opening guiding said slide and holding the same in captive position alongside the rod and parallel to the rod axis, the combined cross-section of the clamping rod just below the clamping head and of the slide approximately fitting the cross-section of said receiving opening and the combined cross-section of the clamping head and the slide exceeding the cross-section of the receiving opening, a coil spring disposed within said elongated opening and encompassing said slide, said spring being arranged and positioned to bias the slide toward the clamping head, a sleeve made of flexible material slidably fitted upon said rod, the sleeve end opposite to said clamping head being secured to the rod for preventing slidable displacement of the entire sleeve relative to the rod, the axial length of the sleeve being so selected that the said sleeve engages the receiver coupling member and experiences a compression in axial direction when said clamping head and said slide are received by said receiving opening, and actuating means for withdrawing the slide relative to the clamping head against the action of said spring and said sleeve.

5. An engaging coupling member as described in claim 1, wherein the said rod opening for receiving the locking slide comprises a laterally open slot extended through the clamping head of the rod and continued into a cavity in the rod portion opposite to the clamping head peripherally defined by a wall configuration positively guiding the locking slide in axial direction, and wherein the locking slide at its end adjacent to the clamping head has a locking head laterally protruding from the periphery of the clamping head when the said heads are placed juxtaposedly one to the other.

6. An engaging coupling member as described in claim 1, wherein the said actuating means include an axially elongated transverse slot in the clamping rod extending into said opening for receiving and guiding the locking slide, and an actuating member secured to said locking slide and laterally extending from the rod through said transverse slot for lifting the slide against the action of the yieldable means.

7. An engaging coupling member as described in claim 4, wherein the said actuating means include an axially elongated transverse slot extending into said opening for the slide, and an actuating member secured to said locking slide laterally extending from the rod through said transverse slot and also with a tight fit through a corresponding hole in said elastic sleeve for lifting the slide against the action of said spring and axially compressing said sleeve.

8. An engaging coupling member as described in claim 1, wherein the said actuating means comprise a sleeve axially slidable on the clamping rod and secured to the slide through a transverse slot in the rod for lifting the slide against the action of the yieldable means.

9. In a locking mechanism of a self-locking connector device for detachably connecting two elements in combination an engaging coupling member comprising a clamping rod including an opening and having on one end a clamping head eccentric to the rod axis, the other end of the clamping rod being adapted to be connected to one of said elements, a locking slide disposed axially slidably within said opening, at least part of the rod wall defining said opening guiding said slide and holding the same in captive position alongside and parallel to the rod, yieldable means urging said slide into a position in which one end thereof is alongside the clamping head, retaining means on the clamping rod and the locking slide coacting with each other for limiting the movement of the slide toward the clamping head by the action of said yieldable means, and actuating means connected with the slide for withdrawing the same relative to the clamping head; and a receiving coupling member comprising a sleeve, and a locking plate disposed intermediate the sleeve ends and having an axial opening therethrough, one end of the sleeve being adapted to be connected to the other one of said elements, the other sleeve end together with the locking plate forming a receiving and guiding cup, the combined cross-section of the clamping rod just below the clamping head and of the slide approximately fitting the cross-section of the receiving opening and the combined cross-section of the clamping head and the slide exceeding the cross-section of the receiving opening.

10. A locking mechanism as described in claim 9, wherein said clamping rod includes a portion having a cross-section corresponding to the inner cross-section of said cup forming sleeve for axially guiding the rod in the cup.

References Cited in the file of this patent

UNITED STATES PATENTS

| | | |
|---|---|---|
| 2,136,875 | Blanc | Nov. 15, 1938 |
| 2,301,833 | Van Sittert | Nov. 10, 1942 |
| 2,365,648 | Rossmann | Dec. 19, 1944 |
| 2,423,250 | Modrey | July 1, 1947 |
| 2,427,297 | Modrey | Sept. 9, 1947 |
| 2,444,843 | Modrey | July 6, 1948 |
| 2,446,030 | Tunnard-Moore | July 27, 1948 |
| 2,448,817 | McArthur | Sept. 7, 1948 |
| 2,464,543 | Modrey | Mar. 15, 1949 |
| 2,632,789 | Modrey | Mar. 24, 1953 |

FOREIGN PATENTS

| | | |
|---|---|---|
| 564,671 | Great Britain | Oct. 9, 1944 |